(12) United States Patent
Hamalainen et al.

(10) Patent No.: US 7,643,799 B2
(45) Date of Patent: Jan. 5, 2010

(54) COMMUNICATION SYSTEM AND METHOD USING TRANSMIT DIVERSITY

(75) Inventors: Jyri Hamalainen, Oulu (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 368 days.

(21) Appl. No.: 11/367,447

(22) Filed: Mar. 6, 2006

(65) Prior Publication Data

US 2006/0148427 A1 Jul. 6, 2006

Related U.S. Application Data

(62) Division of application No. 10/478,242, filed as application No. PCT/EP01/05833 on May 21, 2001, now Pat. No. 7,224,943.

(51) Int. Cl.
*H04B 1/00* (2006.01)
*H04B 7/00* (2006.01)

(52) U.S. Cl. .................. 455/69; 455/101; 455/507
(58) Field of Classification Search .............. 455/73, 455/101, 275, 517, 78, 69, 507, 575.1, 90.1; 370/342, 344, 347, 479
See application file for complete search history.

(56) References Cited

U.S. PATENT DOCUMENTS

| 5,151,622 | A | 9/1992 | Thrower et al. |
| 6,504,884 | B1 | 1/2003 | Zvonar |
| 6,754,473 | B1 | 6/2004 | Choi et al. |
| 6,766,144 | B2 | 7/2004 | Kim et al. |
| 6,778,514 | B1 * | 8/2004 | Boccuzzi et al. ............ 370/334 |
| 6,842,632 | B2 | 1/2005 | Raghothaman et al. |
| 6,952,455 | B1 | 10/2005 | Banister |
| 7,224,943 | B2 * | 5/2007 | Hamalainen et al. .......... 455/69 |
| 2001/0016504 | A1 | 8/2001 | Dam et al. |
| 2003/0031244 | A1 | 2/2003 | Vaidyanathan |
| 2003/0227979 | A1 | 12/2003 | Tirkkonen |
| 2005/0030897 | A1 | 2/2005 | Sandhu |
| 2005/0181736 | A1 | 8/2005 | Cao et al. |
| 2005/0260954 | A1 | 11/2005 | Hamalainen et al. |

(Continued)

FOREIGN PATENT DOCUMENTS

WO WO 00/72464 11/2000

OTHER PUBLICATIONS

"Closed-loop transmit diversity for FDD WCDMA Systems", Hamalainen et al, Conference Record of the Thirty-Fourth Asilomar Conference on Signals, System and Computers (Cat. No. 00CH37154), Oct. 29-Nov. 1, 2000, pp. 111-115, vol. 1, XP002193118.

(Continued)

*Primary Examiner*—Edward Urban
*Assistant Examiner*—Christian A Hannon
(74) *Attorney, Agent, or Firm*—Squire, Sanders & Dempsey L.L.P.

(57) ABSTRACT

Influencing the transmission of signals from a transmitting device to a receiving device in a communication system comprising at least one transmitting device and at least one receiving device is disclosed. In a receiving station received transmission signals are processed and a feedback signal to be transmitted to a transmitting device is generated on the basis of the processed signals. Then, transmit weights to be applied to transmission signals are determined in accordance with the feedback signal.

11 Claims, 3 Drawing Sheets

U.S. PATENT DOCUMENTS

2006/0099915 A1    5/2006    Laroia et al.

OTHER PUBLICATIONS

"Advanced Closed Loop Tx Diversity Concept", 3GPP TSG RAN WG 1, Jul. 4, 2000, XP002169992, Siemens.

"Feedback Schemes for FDD WCDMA Systems in Multipath Environments", Hamalainen et al, IEEE VTS 53$^{rd}$ Vehicular Technology Conference, Spring 2001, Proceedings (Cat. No. 01CH37202), May 6-9, 2001, pp. 238-242, vol. 1, XP002193119.

3G TS 25.201: "$3^{RD}$ Generation Partnership Project: Technical Specification Group Radio Access Network: Physical Layer—General Description", Ver, 3.02, Mar. 2000.

3 GPP RAN WG1:#15, "Performance Results of Basis Selection Transmit Diversity for 4 Antennas", R1-00-1073, Aug. 2000.

3G TS 25.201: "3rd Generation Partnership Project: Technical Specification Group Radio Access Network: Physical Layer—General Description", Ver., 3.02, Mar. 2000.

3 GPP RAN WG1: #15, "Performance Results of Basis Selection Transmit Diversity for 4 Antennas", R1-00-1073, Aug. 2000.

* cited by examiner

COMMUNICATION SYSTEM AND METHOD USING TRANSMIT DIVERSITY

CROSS REFERENCE TO RELATED APPLICATIONS

This application is a divisional of U.S. application Ser. No. 10/478,242, filed Nov. 19, 2003, which was a national stage filing under 35 U.S.C. § 371 of International Application No. PCT/EP01/05833, filed on May 21, 2001. These applications are hereby incorporated by reference and relied upon in their entirety.

FIELD OF THE INVENTION

The present invention relates to a method and a system for influencing signals transmitted from a transmitting device to a receiving device.

BACKGROUND OF THE INVENTION

Transmit diversity techniques provide attractive solutions for increasing downlink capacity in 3G (Third Generation) communication systems within low-mobility environments. The complexity to implement transmit diversity mainly burdens the base station making the technique more suitable for low-cost handsets than, e.g., receive diversity. Open-loop and closed-loop transmit diversity techniques have been already standardized and improvements are being developed constantly with 3GPP (Third Generation Partnership) WCDMA (Wideband Code Division Multiple Access) FDD (Frequency Division Duplex) and TDD (Time Division Duplex) modes, and transmit diversity is considered with EDGE (Enhanced Data rates for GSM Evolution) standardization as well.

In closed-loop transmit diversity techniques two of the critical phenomena that may change the performance of the closed-loop schemes are the temporal correlation corresponding to each antenna separately and the spatial correlation between the antennas. The first one of these phenomena is critical when mobile is moving and/or a feedback word is long. The second phenomenon is affecting usually slower or there might even be static correlations between antennas. However, it is not realistic to assume that the spatial correlation properties remain the same in all environments. Therefore it is of great interest to search schemes that are able to adapt to the characteristics of the fading channel.

When there are several antenna elements in a transmitter antenna array, it is useful to design feedback modes (as mode 1 and mode 2 in FDD WCDMA) by which the downlink capacity can be increased. The conventional design criteria for these modes is based on the channel covariance matrix R given by $$R = H^H H, H = (h_1, h_2, \ldots, h_M), h_m = (h_{m,1}, h_{m,2}, \ldots, h_{m,L})^T,$$

where M is the number of transmit antennas, L is the number of channel paths and $h_{m,l}$ is the complex channel coefficient corresponding to lth path of the channel between antenna m and mobile. The problem is to find antenna weight vector $w = (w_1, w_2, \ldots, w_M)^T$ such that $$w^H R w = \|Hw\|^2 = \left\| \sum_{m=1}^{M} h_m w_m \right\|^2$$

is maximized. Another common approach is to choose w such that $$\frac{w^H R w}{w^H K w}$$

where K refers to the covariance of the noise and interference, is maximized. Alternatively, the generalized eigenvalue problem can be expressed to maximize $$w^H H^H K^{-1} H w$$

where $K^{-1}$ is inverse or pseudo inverse of K. Furthermore, a channel covariance matrix can be calculated using a subset of channel paths.

Since the feedback capacity is limited, we must choose a quantized set of feedback vectors w and design algorithms that provide best possible choice of w among all quantized weights. The standard describes two feedback modes where the first mode adjusts phases only and the second one adjusts transmit power as well [1]. Moreover, selection and/or phase adjustment algorithms have been proposed in [2]. The algorithms are based only on the fast feedback and they do not take into account the spatio-temporal properties of the channel. Furthermore, the quantization sets have been fixed in all previous concepts and specific values of weights have been chosen beforehand to be the same in all environments.

Recently, Siemens proposed an "eigenbeamformer" approach [3] where MS (Mobile Station) measures R and signals a subset of eigenvectors to the BS (Base Station), which are subsequently used for transmission. The idea is to reduce dimension so that, for example, in the case of 4 Tx (Transmit) antennas the MS needs to monitor only two beams and consequently feedback signaling works with higher mobile speeds than in the case when the mobile station continuously updates weights of the 4 transmit antennas. However, if there is no spatial correlation between the antennas the SNR (Signal to Noise Ratio) improvement becomes the same as with 2 Tx antennas. Furthermore, Siemens remarks that it is not necessary to calibrate the antennas when beamforming is based on the feedback from mobile to base.

For a moment it is assumed that we have a single path Rayleigh fading channel, M uncorrelated transmit antennas and relative phases of signals from different antennas have been adjusted by applying an algorithm given in [4]. That is, some or all signals from the different antennas are ranked and each phase is independently adjusted against the phase of the reference channel or antenna. Moreover, assume that the channel coefficients have been ordered with respect to their amplitudes $\alpha_m = |h_m|$ into a descending order. Using the brackets in subindices denotes the given order. Then the expected SNR is given by:

$$E\left\{ \left| \sum_{m=1}^{M} h_{(m)} w_m \right|^2 \right\} = u^T C \cdot u, \qquad (1)$$

$$u = (|w_1|, |w_2|, \ldots, |w_M|),$$

where components of the weight vector u are now real and non-negative. Here C is the ordered covariance matrix that takes into account the correlation between amplitudes and phases. (Note that C and R are different.) C is an example of an ordered and phase adjusted channel matrix. It is found that the elements of C are the following $$c_{m,m} = E\{\alpha_{(m)}^2\},\qquad(2)$$

$$c_{m,1} = c_N E\{\alpha_{(m)}\alpha_{(1)}\},$$

$$c_{m,k} = c_N^2 E\{\alpha_{(m)}\alpha_{(k)}\},\ m \neq k,$$

$$c_N = \frac{2^N}{\pi}\sin\left(\frac{\pi}{2^N}\right).$$

Here N is the number of phase adjustment feedback bits per antenna. If there is no spatial correlation between antennas, then the above expectations can be computed analytically and thus, weight vector u can be chosen beforehand since it is the eigenvector corresponding to the largest eigenvalue of C. The adjustment algorithm is then such that the mobile station estimates the channel from M antennas and orders the samples according to magnitude. The mobile station can either store the whole order information or only part of it. Relative phases of the signals (not necessarily all phases; this depends on the specific algorithm) are then adjusted, i.e. the mobile station searches through possible adjustment combinations applying some algorithm and then chooses the best combination. Both the order and phase adjustment information is then sent to the transmitter in the base station. The transmitter selects antenna weights w based on the feedback information. The phases are obtained directly from the FB (Feed Back) information and magnitudes of weights are selected using quantization based on (1) and (2) when order information is known. This requires in total log2(M!)+(M−1)N FB bits (M! is the number of permutations of $\{\alpha_m\}_{m=1}^M$, and N is the number of phase bits/antenna), and the SNR improvement is very close to the theoretical maximum, for example SNR=3.8 in the case of M=4 Tx antennas and N=3 phase adjustment bits/antenna. Suboptimal FB weights requiring less FB bits can be determined using similar procedure as proposed in [4]. For example, if all antennas but the strongest one have the same Tx amplitude weight then only log2(M)+(M−1)N FB bits are required.

However, there are some basic restrictions in the above procedure. Channels can attain multipath structure, fading statistics can be due to Rice, Rayleigh, Nagakami statistics or something else, and antennas can be spatially correlated. Moreover, the nature of all these phenomena can change when mobile is moving. Therefore, it is not always practical to fix the same weight magnitude quantization beforehand as it has been done in the above theoretical consideration, and as has been specified in Tx diversity mode 2 of FDD WCDMA.

SUMMARY OF THE INVENTION

It is an object of the present invention to increase the downlink capacity in a wireless communication system where the transmitter can be provided with only a limited information of the channel state.

According to the present invention, this object is achieved by a method and/or system as defined in any one of the attached claims, having an improved functionality.

Moreover, the present invention provides a receiving device (e.g. a user equipment such as a mobile station) having a function to calculate a feedback signal to be sent to the assigned transmitting device of the Radio Access Network (RAN) such as RNC or BSS, for improved reception by the receiving device.

Furthermore, the present invention provides a transmitting device (e.g. RNC, BSS) having a function to determine transmit weights for transmission signals to be sent to the assigned receiving device such as a mobile station, for improved reception by the receiving device.

According to the present invention, adaptive algorithms for calculating transmit weights are described. Due to the adaptive nature, the application domain of the closed loop transmit diversity algorithms is enlarged. Moreover, endless quarrels about transmit diversity modes can be terminated because, according to the present invention, no fixed transmit weight combination is specified. Beamforming solutions are typically based on a channel covariance matrix R. Thus, beamforming assumes correlation between the transmit antennas, and therefore it does not give good results in all environments. The adaptive transmit diversity algorithm is based on real ordered covariance matrix C which does not contain any directional information. Instead, the directional information is provided by the short term feedback, i.e., phase adjustment.

An embodiment of the present invention describes adaptive weight generation for closed loop transmit diversity schemes in general for any kind of channel environment. Moreover, the goal of this embodiment is to propose a principle (not just a specific algorithm) where amplitude weights are generated by using low-pass filtering in a certain manner so that the main point is not the generation of the feedback signal, i.e. order and phase information, but determining transmit weights corresponding to some feedback signal format. These weights are generated and used in BS (no feedback from MS) or generated in MS and signaled to BS (note that this long-term feedback is different from the one in the 3GPP contribution [3]), while feedback against fast fading is generated in MS (for example as in modes 1 and 2 in WCDMA). Instead of signaling the transmit weights MS may also signal the elements of the ordered covariance matrix to BS. When generating the transmit weights BS may use these elements.

According to the present invention, amplitude or transmit weights correspond to correlation of transmit antennas or transmit elements.

According to an embodiment of the present invention, a mechanism is disclosed by which different diversity schemes can be turned on and off according to properties of the physical connection. It is known that there are several parameters that affect to the performance of different open and closed loop diversity algorithms. For example, the affect of mobile speed becomes crucial when more than two antenna closed-loop diversity schemes are used. Therefore, it is described to apply different algorithms for channels having different time correlation properties. Instead of measuring the time correlation of the channel in MS it is proposed that the measure for time correlation is computed by using the already existing feedback bits in BS. This is done by a simple filtering. The two key ideas of this embodiment are the dynamic use of different diversity schemes (open or closed-loop) and the use of already existing feedback information in BS in order to choose the most suitable diversity scheme. The latter helps to keep the complexity of MS low.

Hence, according to the present invention, adaptive weight generation and transmit weight determination corresponding to some feedback signal format is enabled. The adaptation may be done based on measurements from uplink, or by long-term feedback from the MS. Also, long term properties of the channel can be taken into account without communicating eigenvectors from the MS to the BS.

According to a further embodiment of the present invention, different feedback schemes are applied to the measured channels and the best scheme is chosen based on maximizing the largest eigenvalue of the ordered covariance matrix.

In the following, the present invention will be described by way of preferred embodiments thereof with reference to the accompanying drawings.

DESCRIPTION OF THE PREFERRED EMBODIMENTS

1. Adaptation to Spatial Properties

According to a first embodiment, the above-described prior art approach is modified such that it adapts to the long-term environment. For this purpose, a more general form is given to the ordered covariance matrix C and the corresponding quadratic form is defined in accordance with:

$$E\left\{\left\|\sum_{m=1}^{M} h_{(m)}^T w_m\right\|^2\right\} = u^T C \cdot u, \quad (3)$$

$$u = (|w_1|, |w_2|, \ldots, |w_M|),$$

where the elements of C are now of the form $$c_{m,m} = E\{\|h_{(m)}\|^2\}, \; c_{m,k} = \mathrm{Re}\{E\{e^{-j\mathrm{arg}(w_m)} h_{(m)}^H h_{(k)} e^{j\mathrm{arg}(w_k)}\}\}, \; m \neq k$$

It is to be noted that the phase adjustments have already been done. Alternatively, gain adjustment can be done before phase adjustment, or phase and gain adjustments can be made jointly in order to maximize the gain. Furthermore, the ordered covariance matrix C can be interpreted in a more general manner as R according to the prior art. Moreover, it is worth of noticing that:

1. Matrix C and thus, the weight vector u are not same for all different resolutions of phase adjustments.
2. The order of antennas is here due the order of magnitudes $\{\|h_{(m)}\|\}_{m=1}^{M}$.
3. C can be measured using low-pass filtering or any adaptive algorithm in the same way as is conventionally done when determining R.
4. C can be measured either in BS or MS and unlike in the case of R (beamforming) a calibration of the antenna array is not required in the BS. Thus, MS can only signal ordering and phase adjustment information and the whole signalling overhead for communicating eigenvectors (which has to be done in [3]) is avoided. Although the pilot signal in FDD WCDMA uplink is power controlled while the common pilot channel in downlink is not, it does not affect the long-term statistics of C.

The angular spread in the BS is typically different from the one in MS. In order to compensate the difference BS may apply some transform to the received signals, e.g. beamforming or independent component analysis, before calculating C.

5. Elements of h may refer to different beams or sectors instead of different antennas. In general, the channel can be a subject to some transform in the mobile station or in the base station, like downlink beamforming, eigenbeamforming [3] or channel equalizing.
6. Naturally, if the MS does not know the actual Tx weights it is difficult to do any antenna weight verification and subsequently use channel estimates calculated from the common pilot channels. However, MS has to order the channel estimates according to magnitudes and therefore it is already equipped with the necessary information to calculate Tx weights. Furthermore, the weights appear to be robust with respect to different environments.

Figure 1:
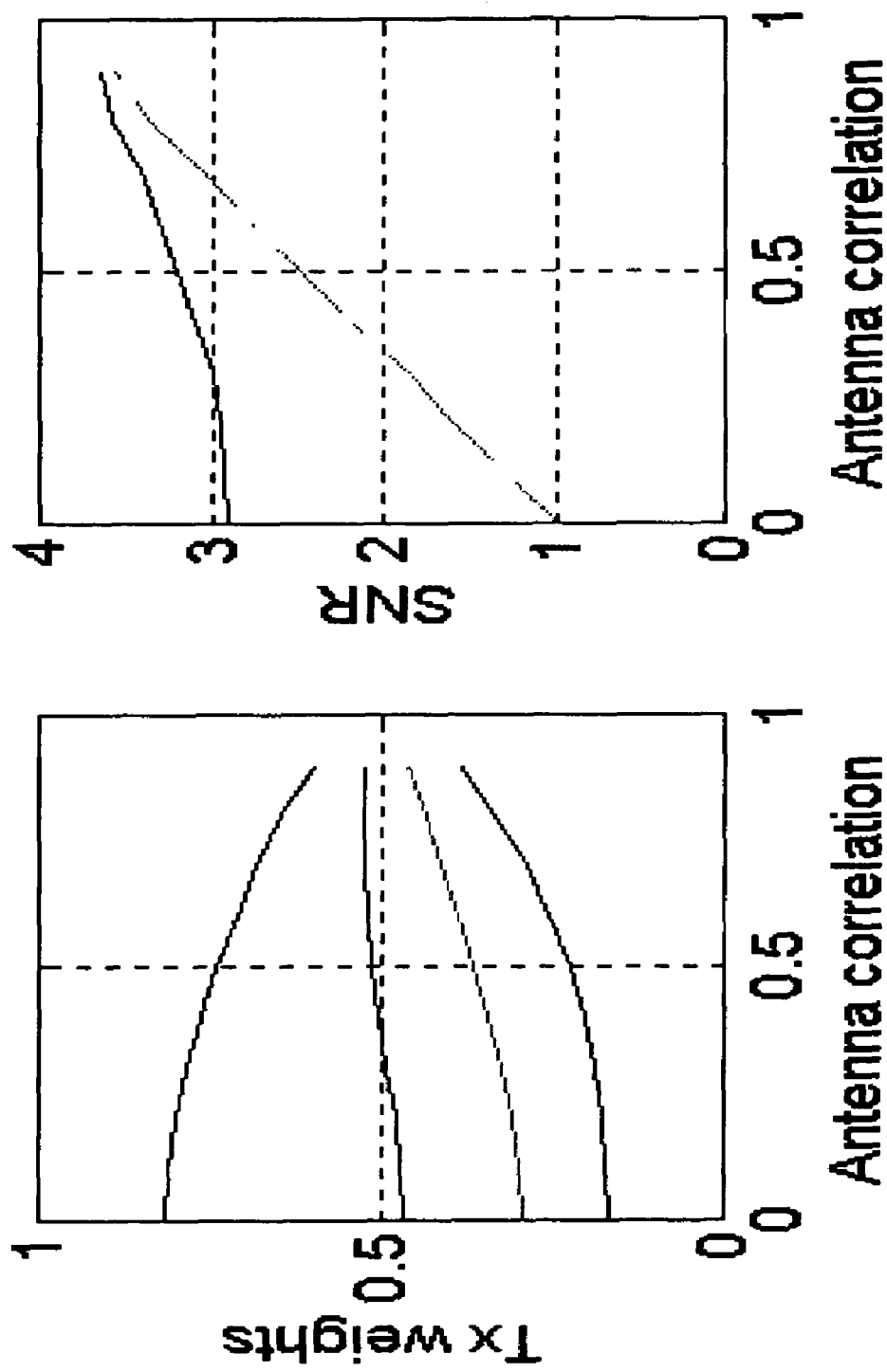
FIG. 1 shows transmit weights and SNR improvement obtained in flat Rayleigh fading channels as a function of antenna correlation when four transmit antennas are applied.

FIG. 1 depicts the optimal transmit weights (amplitudes) and SNR improvement (linear scale) as a function of antenna correlation (correlation is the same between the antennas) when M=4 antennas and 1 bit/antenna is used for phase adjustment. In the rightmost diagram, solid and dashed lines refer to SNR with and without feedback, respectively. It is noticed that weights are robust to spatial correlation. Furthermore, SNR improvement converges to that of beamforming when antenna correlation is increasing.

Figure 2:
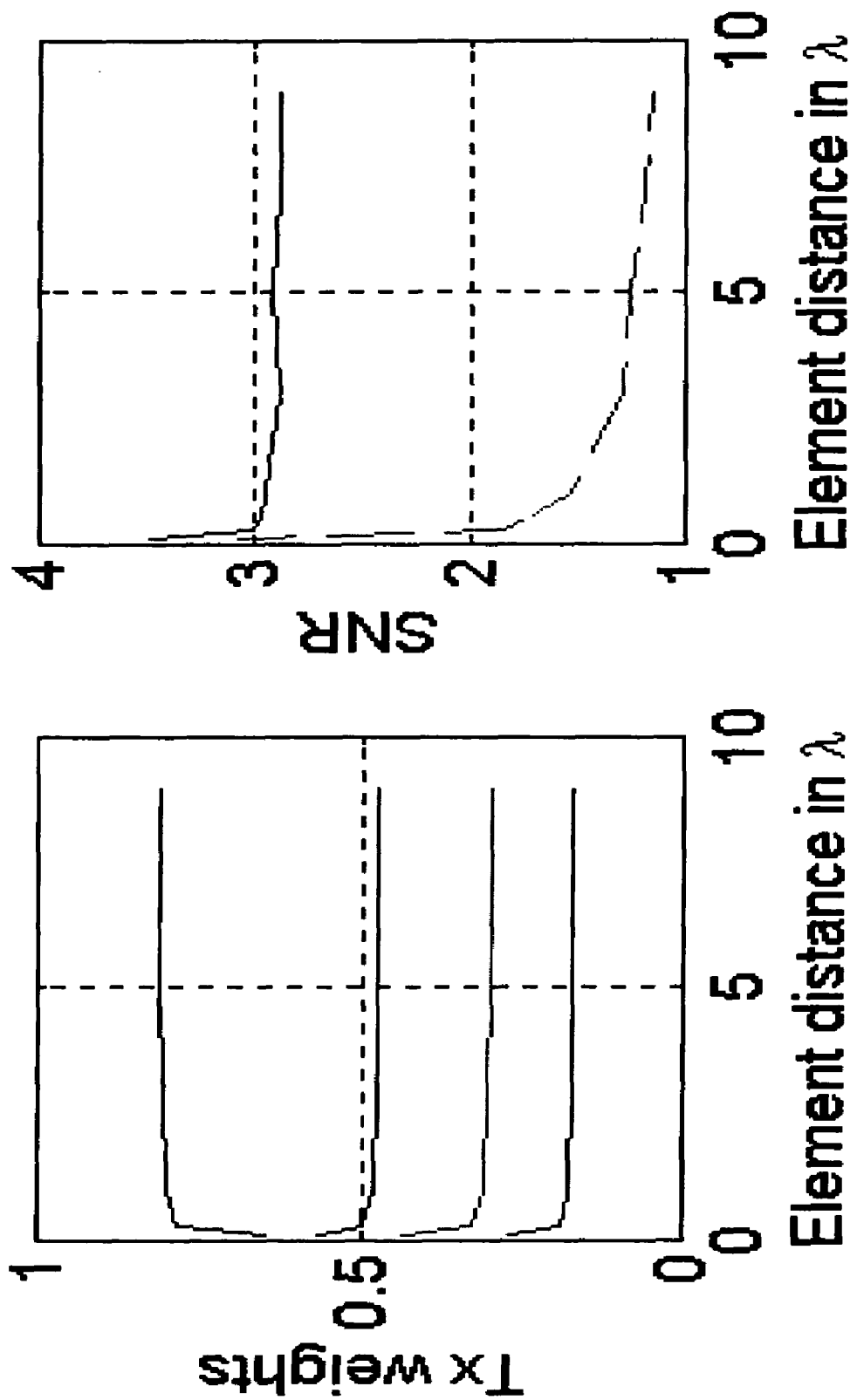
FIG. 2 shows transmit weights and SNR improvement obtained in flat Rayleigh fading channels as a function of spatial distance between antenna elements when four transmit antennas are applied.

FIG. 2 shows transmit weights and SNR improvement as a function of spatial distance between the antenna elements when M=4 and 1 bit/antenna is used for phase adjustment like before. It is observed that only at the distance of 0.1 wavelengths transmit weights start to converge to the same value, and SNR improvement with FB remains fairly constant with wavelengths greater than 0.1. (theoretical SNR gain=2.95 with 4 independent single-path Rayleigh fading channels). Naturally, when antennas are strongly correlated, the amount of diversity is reduced and BER will be different although the average SNR gain remains almost the same.

Figure 3:
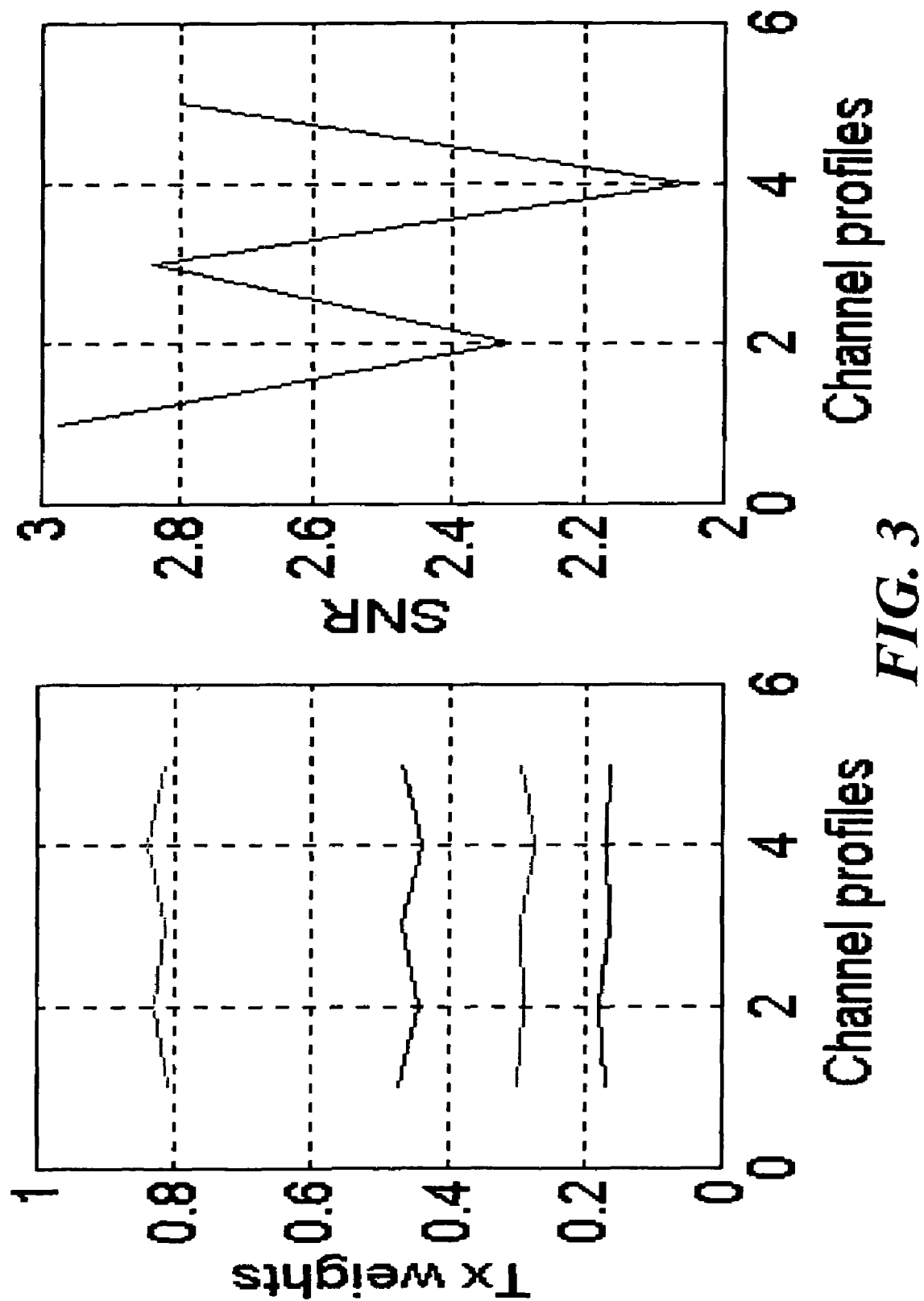
FIG. 3 shows transmit weights and SNR improvement as a function of channel profiles when four transmit antennas are applied.

In FIG. 3, on the abscissa, 1 denotes a single-path channel, 2 a 2-path channel with equal powers, 3 an outdoor-to-indoor channel, 4 a vehicular channel, and 5 a pedestrian channel, where all paths experience independent fading. FIG. 3 shows that the weights are robust with respect to different channel models as well. Given the robustness to different environments it might be even possible to predefine a set of transmit weights based on simulations and field measurements. Anyway, it may still be not necessary to signal actual transmit weights because MS and BS should come up with similar weights.

7. Although the transmit weights are robust to different fading channels, the diversity gain is inversely proportional to the spatial correlation. In addition to C the BS may measure R as well and then, for example, introduce a small frequency offset in order to decrease spatial correlation. This should not affect C so that the BS and MS still agree from the Tx weights.
8. In practice the feedback channel is subject to errors so that the gain and transmit weights obtained from equation (3) may not correspond to the actual situation. The network may use some nominal feedback error probability and its probability density function, and signal it to the MS, or BS can estimate the quality of the feedback channel and send the information to MS. MS or BS can then simulate FB errors when calculating transmit weights.
9. Equation (3) attempts to combine coherently all M signals. However, it is also possible to apply the same concept when the transmit antennas are divided into groups which are combined incoherently. This corresponds to soft handover in WCDMA, or when some open loop transmit diversity is applied together with the feedback. Equation (3) becomes $$E\left\{\sum_{i=1}^{K}\left\|\sum_{m=1}^{M}h_{i,(m)}^{T}w_{i,m}\right\|^{2}\right\}=\sum_{i=1}^{K}u_{i}^{T}C_{i}\cdot u_{i}$$

Depending on the capacity of the feedback channel, $u_i$ may be different or same.

10. In order to estimate R or C it is necessary to estimate M channels. However, in some cases parallel channel estimation might not be possible, because M parallel pilot signals are not present for channel estimation, or the energy of pilot signals is different. In the latter case, the effect can be compensated so that equation (3) becomes $$E\left\{\left\|\sum_{m=1}^{M}g_{(m)}^{T}w_{m}\right\|^{2}\right\}=u^{T}C\cdot u$$

where $g_i = h_i k_i$ and $k_i$ is a priori or estimated transmit amplitude of the pilot signal from antenna i. Alternatively, the integration times of the channel estimates can be set in such a way that the SIR in the output of the channel estimates becomes equal. In the former case time delays $\tau_i$ associated to the channel estimates are different. C is then estimated in such a way that all combinations of delays $\tau_i - \tau_j$, $i \neq j$ between the channel estimates appear at an equal number of times when calculating the estimate.

11. Finally, we note that if the correlation between antennas is not the same for all pairs of antennas, then instead of finding just a single weight vector, we now need to find (at most) M! different weight vectors. This happens since we need a different weight vector corresponding to each possible order of M base station antennas. However, in most practical cases it is enough to find weights u only for some partial orders. For example, if we use a feedback scheme, where we first search the best antenna in terms of gain among four possible antennas and then adjust the relative phases between the best antenna and the nearest antenna, then we need only four different weight vectors. In such case we can decide, for example, beforehand that If antenna 1 is best then its phase is adjusted against antenna 2. Other antennas are shut down.

If antenna 2 is best then its phase is adjusted against antenna 1. Other antennas are shut down.

If antenna 3 is best then its phase is adjusted against antenna 4. Other antennas are shut down.

If antenna 4 is best then its phase is adjusted against antenna 3. Other antennas are shut down.

Weight vectors $u_1$, $u_2$, $u_3$, $u_4$ are related to these four cases. They are eigenvectors corresponding to largest eigenvalues of 2×2 ordered covariance matrices $C_1$, $C_2$, $C_3$, $C_4$. In order to give these covariance matrices we write $e_{m,m}^{l} = E\{|h_m|^2 | \text{'l'th antena is best'}\}$,
$e_{m,k}^{l} = E\{h_m^H h_k | \text{'l'th antena is best'}\}$, $m \neq k$, where it is assumed that phase adjustments are already done. Now we derive $$C_1 = \begin{pmatrix} e_{1,1}^1 & e_{1,2}^1 \\ e_{2,1}^1 & e_{2,2}^1 \end{pmatrix},$$

$$C_2 = \begin{pmatrix} e_{1,1}^2 & e_{1,2}^2 \\ e_{2,1}^2 & e_{2,2}^2 \end{pmatrix},$$

$$C_3 = \begin{pmatrix} e_{3,3}^3 & e_{3,4}^3 \\ e_{4,3}^3 & e_{4,4}^3 \end{pmatrix},$$

$$C_4 = \begin{pmatrix} e_{3,3}^4 & e_{3,4}^4 \\ e_{4,3}^4 & e_{4,4}^4 \end{pmatrix}.$$

In practise, simulation or experimental data is divided into 4 classes corresponding to best antennas and the relative correlations are computed. After that weight vectors $u_1$, $u_2$, $u_3$, $u_4$ are solved.

2. Adaptation to Temporal Properties

According to a second embodiment, an idea is to control the length of the feedback word in order to avoid the situation where channel changes remarkable during the feedback delay. The change of the feedback word is done in the following way: firstly, the feedback mode is designed such that the feedback word corresponding to the scheme is built up from several shorter feedback words. That is, the feedback word is built up from smaller building blocks for example as follows

| | FB bit # | | | | | | | |
|---|---|---|---|---|---|---|---|---|
| | 1 | 2 | 3 | 4 | 5 | 6 | 7 | 8 |
| FB block # | 1 | 1 | 2 | 2 | 3 | 3 | 3 | 3 |

Here an FB word can be 2, 4 or 8 bits long and its structure is hierarchical in the sense that if the channel remains constant or almost constant during the feedback delay, then performance is improving when the FB word is becoming longer. Hence, feedback words of different lengths can be used based on the temporal properties of the channel. If the channel is changing very slowly (i.e., the mobile is moving slowly) then the longest available word can be used, and when the changes of the channel become more rapid then shorter and shorter words are applied. In the above example, there are three alternatives for the FB word.

Control of FB Word

Several mechanisms for controlling the length of the feedback word can be designed. The length of FB word can be decided, for example, using the following schemes:

Compute the level crossing rate in MS or BS and estimate the velocity of mobile from that measure. This is an indirect approach since we are not interested in the mobile speed as such but the performance of FB, and therefore it may not give reliable results from FB performance point of view.

Compute SNR gain from the pilot channel in MS or BS by using the previous transmit weights with time delay d and from time to time ask BS or MS to change the length of the word. This is a direct approach in the sense that by trying out different FB lengths and consequently different Tx weights and delays the results are proportional to expected SNR improvement of the corresponding FB mode. However, this requires extra computational load and memory.

Study the previous feedback commands during some time interval in MS or BS and send FB change requests to BS or MS based on that information. This control scheme is very simple to implement. Since we know what is the length of the present FB word, we can compute different measures based on the previously received FB words. For example, it is assumed that the length of the present FB word is 5 bits and the following FB words have been received from two separate mobiles

| Time | FB word from mobile 1 | FB word from mobile 2 |
|---|---|---|
| 1 | 1, 1, 1, 0, 1 | 1, 0, 0, 1, 0 |
| 5 | 1, 0, 1, 1, 0 | 1, 0, 0, 1, 0 |
| 10 | 1, 0, 1, 1, 1 | 1, 0, 0, 1, 1 |
| 15 | 0, 1, 1, 1, 1 | 1, 0, 0, 1, 1 |
| Number of Changes | 1, 2, 0, 1, 2 | 0, 0, 0, 0, 1 |

Already this short time gives a hint that the channel corresponding to the first mobile is changing rapidly and therefore it seems that a shorter FB word should be allocated to mobile 1. On the other hand, it is seen that the FB word corresponding to the second mobile is not changing much. Thus the present feedback scheme can be kept or the feedback word can even be enlarged. Instead of enlarging the FB word BS may also choose to collect more than one consecutive feedback signals and process them jointly in order to diminish the effect of feedback errors.

Example of a Control Algorithm

Let us denote the binary feedback words by $w_t$. The Hamming distance between words $w_t$ and $w_s$ is given by $$d(w_t, w_s) = \sum_{l=1}^{L} |w_t(l) - w_s(l)|,$$

$$w_t = (w_t(1), w_t(2), \ldots, w_t(L)),$$

where it is assumed that the length of the feedback word is L bits. It is noticed that the value of the time index t changes only after each L feedback bits. Further we write $d(t)=d(w_t, w_{t-1})$ and define the decision variable D(t) by $$D(t) = \sum_{k=t}^{T} \kappa^{T-k} d(t+T-k), 0 < \kappa < 1,$$

where values of κ and T are found by simulations, field measurements etc. when a specific feedback scheme has been chosen. If we have, for example, three different feedback modes, where the corresponding feedback words are of the length $L_1 < L_2 < L_3$, then we set two threshold levels for the decision variable D(t) and change the mode always when appropriate threshold level have been crossed.

All of the above schemes assume that FB control information is transmitted either from mobile to BS or vice versa. Thus, some of the available capacity needs to be allocated for that purpose. However, the update rate of this control information can be several frames since temporal properties of the channel are not changing rapidly and only few bits of control information is needed.

EXAMPLE

In the following, an example scheme (4 antennas) is described that is built up in three stages. That is, the FB word corresponding to this scheme can be of length 2, 4 or even 8 bits. Each new stage is based on the previous stage.

Description of Stages 1-3:

Stage 1. (Length of the FB word is 2 bits) This stage uses two feedback bits in order to find the best channel in terms of power among the 4 possible alternatives.

Stage 2. (Length of the FB word is 4 bits) Now we use first stage 1. That is, we first decide which antenna is best in terms of gain and define first 2 FB bits. Then we choose some antenna (known for both transmitter and receiver; for example, if antenna 1 is best, then the chosen antenna is antenna 2, etc.) and adjust the relative phases between these two antennas. Third and fourth FB bits are now defined. It should be noticed that since the transmitter knows which antenna is the best one (in terms of gains), antenna weights can be applied given in a manner that is explained in accordance with the first embodiment.

Stage 3. (Length of the FB word is 8 bits) Now we use first stage 2. Then we choose some third antenna (known for both transmitter and receiver) and adjust the relative phase between first two antennas and third antenna. This gives us fifth and sixth FB bits. Again antenna weights are changed in the transmitter. The final two FB bits are used in order to adjust the relative phase between the last antenna and three already adjusted antennas. Antenna weights are updated in each step.

Full order information requires log2(M!) FB bits, but it is possible to apply feedback refinement to transmit powers analogous to FDD WCDMA mode 1 which applies the refinement to phases. That is, during each slot only partial information is signaled, e.g. slot i tells whether antenna 1 is stronger than antenna 2, slot i+1 tells if antenna 3 is stronger than antenna 4, slot i+2 if antenna 2 is stronger than antenna 3, etc. Alternatively, only the strongest antenna can be signaled from MS to BS, and the BS maintains the ordered list of the antenna gains. Whenever new order information arrives, the list is updated so that, for example, the previous strongest antenna is moved to the second strongest position in the list. In general, the partial feedback can obey round robin signaling, where slot i tells the strongest antenna, next slot tells the second strongest antenna, etc., and BS maintais ordered list of the antenna gains.

Modification to Spatial Adaptation

According to a third embodiment, multiple feedback words of different lengths are calculated and applied to the received signal after an appropriate delay. This gives rise to different ordered covariance matrices $C_i$ and the one with the largest eigenvalue indicates the best feedback signal format for the current mobile speed. The calculation can be performed in MS or BS, and it maps the mobile speed directly to the expected gain of a closed loop mode. This is different from the typical Doppler shift estimation which is an indirect measure and may not provide appropriate information for switching between different closed loop modes. For example, when the correlation between transmit antennas is large, phase differences between the antennas as a function of mobile speed do not experience as rapid fluctuations as in the case of uncorrelated transmit antennas. The procedure is similar to setting SIR target in outer loop power control, i.e. closed loop modes are required to provide some gain target, and mode switching is performed based on the estimated SNR gains. Furthermore, gain estimation in BS may utilize additional information obtained from the received power control commands to increase the reliability of the mode switching by, for example, shortening the feedback word if the transmitted power shows an increasing trend.

Instead of calculating different matrices C as specified in the previous paragraph, it is possible to calculate a single C and monitor the corresponding transmit weights when deciding whether to change the structure of the feedback message. For example, if all weights are close to each other the signaling of the order information can be turned off so that only phase feedback is applied. If some transmit weight becomes small, the corresponding phase feedback can be turned off.

MS or BS can estimate both R and C simultaneously and monitor the corresponding gains in order to perform mode switching. For example, if the maximum eigenvalues of R and C are close to each other MS and BS could apply only long-term feedback to signal the eigenvector corresponding to the maximum eigenvalue of R.

While the invention has been described with reference to preferred embodiments, the description is illustrative of the invention and is not to be construed as limiting the invention. Various modifications and applications may occur to those skilled in the art without departing from the true spirit and scope of the invention as defined by the appended claims.

REFERENCES

[1] 3GPP RAN WG1: "UTRA Physical Layer General Description", 25.201, Ver 3.0.2, March 2000
[2] 3GPP RAN WG1: "Performance results of basis selection transmit diversity for 4 antennas", R1-00-1073
[3] 3GPP RAN WG1: "Advanced closed loop Tx diversity concept (eigenbeamformer)", R1-00-0853
[4] Jyri Hämäläinen, Risto Wichman: "Closed-loop transmit diversity for FDD WCDMA systems", 34th Asilomar Conference on Signal, Systems and Computers, October-November 2000

The invention claimed is:

1. An apparatus comprising:
    a processor configured to
        process transmission signals received from a transmitter,
        generate a feedback signal on the basis of the transmission signals processed by the processor,
        process feedback information during a certain time period, the feedback information including the feedback signal and previous feedback signals,
        select a feedback mode and a corresponding feedback word length on the basis of the feedback information,
        wherein the feedback signal comprises a feedback word which is to be generated according to the feedback mode selected,
        wherein the processor is configured to control the corresponding feedback word length in accordance with temporal properties of a channel between the transmitter and the apparatus, and
        wherein the processor to control the corresponding feedback word length is configured to compare previous feedback words and detect the change in the feedback words of same length, and select the corresponding feedback word length in accordance with the detected change in the feedback words, and
        transmit the feedback signal to the transmitter.

2. The apparatus according to claim 1, wherein the apparatus is configured to receive transmission signals from two or more transmitting elements of the transmitter for transmission using transmit diversity technique.

3. The apparatus according to claim 2, wherein the processor is configured to detect differences between transmission signals received from different transmitting elements, adapt channel coefficients between the transmitting elements and the apparatus in accordance with the detected signal differences, form an ordered covariance matrix C of the adapted channel coefficients, evaluate the largest eigenvalue of C, and calculate the eigenvector corresponding to the largest eigenvalue, and generate a feedback signal in accordance with the calculated eigenvector.

4. The apparatus according to claim 3, wherein the feedback signal comprises two or more feedback words of different lengths, and the processor is configured to form an ordered covariance matrix C for each feedback word length, evaluate the largest eigenvalue for each ordered covariance matrix C, compare the largest eigenvalues, and determine the feedback word corresponding to the matrix C with the largest eigenvalue of the largest eigenvalues as best feedback mode.

5. The apparatus according to claim 1, wherein the apparatus is configured to transmit determined feedback control information to the transmitter.

6. A method comprising:
    processing, at a receiving device, transmission signals received from a transmitter;
    generating a feedback signal on the basis of the transmission signals processed;
    processing feedback information during a certain time period, the feedback information including the feedback signal and previous feedback signals;
    selecting a feedback mode and a corresponding feedback word length on the basis of the feedback information,
    wherein the feedback signal comprises a feedback word which is to be generated according to the feedback mode selected,
    wherein the corresponding feedback word length is controlled in accordance with temporal properties of a channel between the transmitter and the receiving device, and
    wherein the controlling of the corresponding feedback word length comprises comparing previous feedback words and detecting the change in the feedback words of same length, and selecting the corresponding feedback word length in accordance with the detected change in the feedback words; and
    transmitting the feedback signal to the transmitter.

7. The method according to claim 6, comprising receiving transmission signals from two or more transmitting elements of the transmitter for transmission using transmit diversity technique.

8. The method according to claim 7, comprising:
    detecting differences between transmission signals received from different transmitting elements;
    adapting channel coefficients between the transmitting elements and a receiving device in accordance with the detected signal differences;
    forming an ordered covariance matrix C of the adapted channel coefficients;
    evaluating the largest eigenvalue of C;
    calculating the eigenvector corresponding to the largest eigenvalue; and
    generating a feedback signal in accordance with the calculated eigenvector.

9. The method according to claim 8, wherein the feedback signal comprises two or more feedback words of different lengths, and the method further comprising:
    forming an ordered covariance matrix C for each feedback word length;
    evaluating the largest eigenvalue for each ordered covariance matrix C;
    comparing the largest eigenvalues; and determining the feedback word corresponding to the matrix C with the largest eigenvalue of the largest eigenvalues as best feedback mode.

10. The method according to claim 6, comprising transmitting determined feedback control information to the transmitter.

11. An apparatus comprising:

processing means, at a receiving device, for processing transmission signals received from a transmitter;

generating means for generating a feedback signal on the basis of the transmission signals processed;

processing means for processing feedback information during a certain time period, the feedback information including the feedback signal and previous feedback signals;

selecting means for selecting a feedback mode and a corresponding feedback word length on the basis of the feedback information, wherein the feedback signal comprises a feedback word which is to be generated according to the feedback mode selected;

controlling means for controlling the corresponding feedback word length in accordance with temporal properties of a channel between the transmitter and the receiving device; and means for, to control the corresponding feedback word length, comparing previous feedback words and detecting the change in the feedback words of same length, and selecting the corresponding feedback word length in accordance with the detected change in the feedback words; and transmitting means for transmitting the feedback signal to the transmitter.

* * * * *